Nov. 29, 1966  A. H. KRASTEL ETAL  3,288,031
GEAR GENERATING MACHINE AND METHOD
Filed Aug. 5, 1965  4 Sheets-Sheet 1

INVENTORS
ADOLPH H. KRASTEL
HARRY PEDERSEN
BY Richard W. Treverton
ATTORNEY

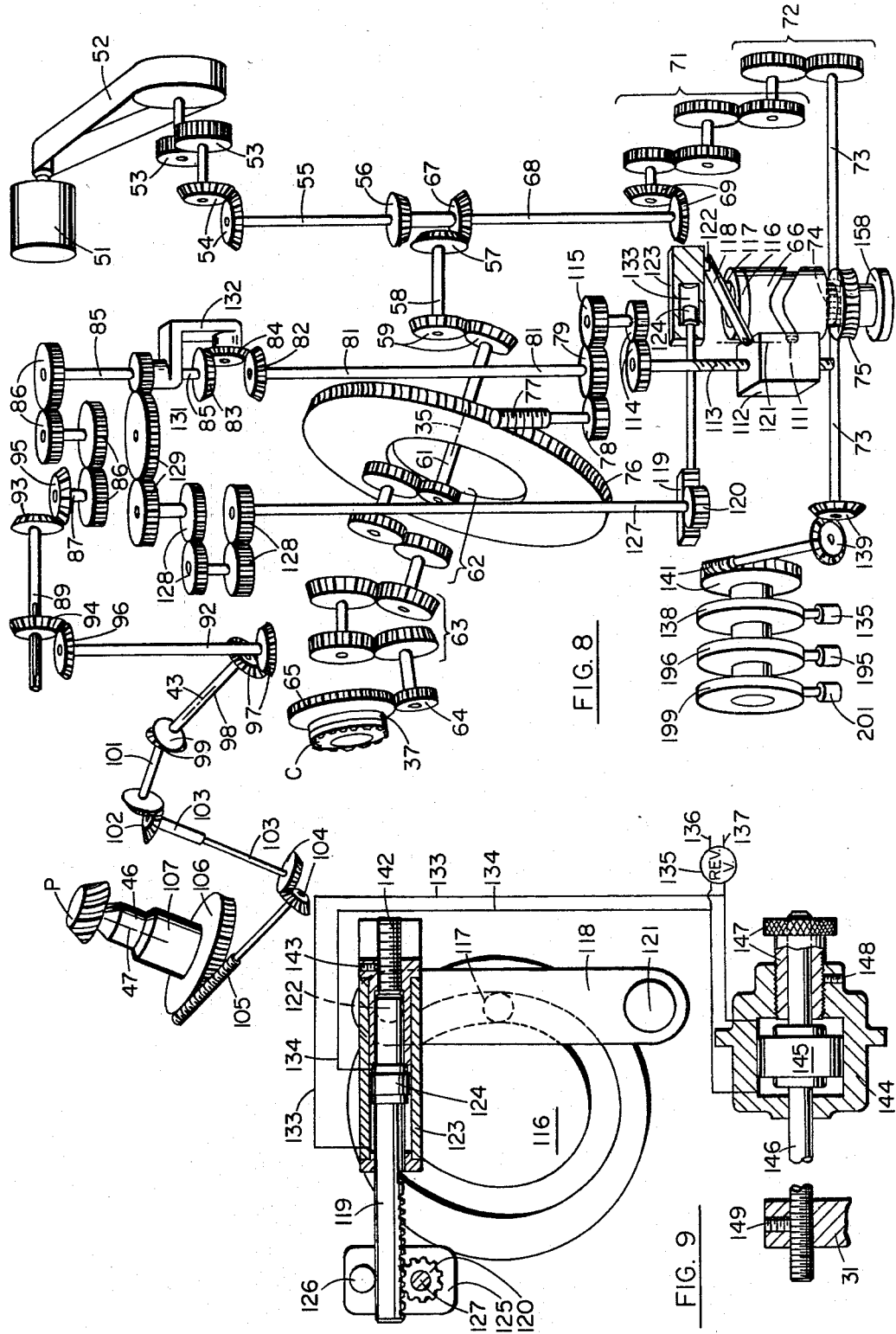

United States Patent Office 3,288,031
Patented Nov. 29, 1966

3,288,031
GEAR GENERATING MACHINE AND METHOD
Adolph H. Krastel and Harry Pedersen, both of Rochester, N.Y., assignors to The Gleason Works, Rochester, N.Y., a corporation of New York
Filed Aug. 5, 1965, Ser. No. 477,510
30 Claims. (Cl. 90—5)

The present invention relates to a machine of the general kind disclosed in Stewart et al. Patent No. 2,667,818 and Wildhaber Patent No. 2,725,792, for generating bevel and hypoid gears, especially pinions, and to the method of generation.

Among the objects of the invention are an improved cutting cycle, especially useful for generating pinions from solid blanks, and an improved arrangement of machine elements which makes this cycle possible and also facilitates the loading and unloading of workpieces and the exchange of cutters.

The cutting cycle includes a plunge milling infeed between the cutter and work that is effected during a dwell or near-dwell in the generating motions of the machine, such dwell being made to occur at the phase of generation in which the concave tooth side near the heel or large end of the slot is cut, this position being highly favorable from the standpoint of the amount of stock that can be removed by plunge milling. Then follow forward and reverse generating motions during which the remainder of the concave side and the convex side of the slot are successively generated. The cutter and work are then disengaged and forward generating motions of the machine are begun, followed by repetition of the dwell and infeed. During the forepart of the forward generating motions, prior to the dwell and with the cutter withdrawn, the work is indexed for the cutting of a succeeding tooth slot. The indexing takes place during a portion of the forward generating motion of the machine that otherwise would be to a large extent wasted because of the offset relation of the angles of generating roll required respectively for the generation of the concave and the convex sides of the tooth slots.

The plunge milling infeed and subsequent withdrawal of the cutter at the heel of the tooth slot is made possible by effecting the infeed and withdrawal in a path that is inclined at an acute angle, on the order of twenty-degrees, to the axis of the cutter-carrying cradle of the machine. This is in contrast with prior machines in which the infeed is in the direction of cradle axis. The change of direction eliminates an interference between the cutter and finished surface of the work which would occur with infeed and withdrawal in the direction of the cradle axis in the phase of generation wherein the cutter acts at the heel of the tooth slot.

According to afore-mentioned Patent No. 2,725,792, tapered tooth slots are produced by employing different ratios of roll, between the work and the cutter-carrying cradle, for generating the opposite sides of the slot. This method, employed primarily to rough cut tooth slots whose opposite sides are thereafter finish cut in separate operations, is limited by the fact that the change in ratio-of-roll also affects the tooth profile curvature, in some cases to an extent for which adequate compensation cannot be made by change in cutter blade angle. Another limitation is that as the spiral angle of the teeth is reduced, change in ratio-of-roll becomes less effective as a means for achieving taper of the slots. An object of the present invention is a means for producing tapered slots which will overcome or at least alleviate these limitations. To this end the machine is provided with means to displace the work back or forth relative to the cutter, in a direction perpendicular to both the work axis and the cradle axis, upon each reversal of the generating motions, and to simultaneously displace the work angularly back or forth about its rotation axis. These displacements, which themselves change the spiral angle of the opposite sides of the tooth slots, may be employed either alone or in combination with ratio-of-roll change, to produce the desired tooth slot taper. By these expedients it has been found that tooth surfaces can be generated which more accurately follow the intended finish tooth shape than has been possible with the prior method.

The foregoing and other objects and advantages of the invention will appear from the following description made with reference to the accompanying drawings, wherein:

FIG. 8 is a diagram of the drive of the machine;

FIG. 9 is a schematic plan view, partly in section, of the mechanism for setting over the work spindle angularly and rectilinearly; and, FIGS. 10 and 11 are schematic views of the mechanisms for moving the cradle housing and work-carrying sector between loading and cutting positions, and for infeeding and withdrawing the cradle housing during the tooth cutting operation.

Figure 1:
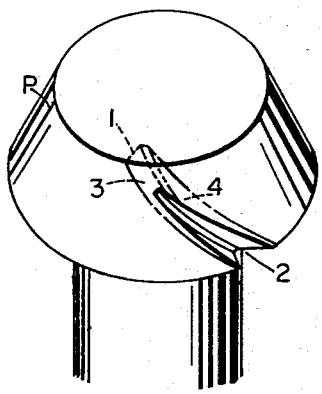
FIG. 1 is a perspective view of a bevel or hypoid pinion having a partially-cut tooth slot.
Figure 2:
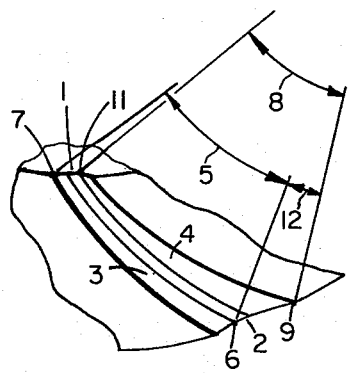
FIG. 2 is a fragmentary schematic view of the pinion in plane development, with the slot completely generated.

FIGS. 1 and 2 show a spiral bevel or hypoid pinion P having a generated tooth slot (appearing in broken lines in FIG. 1) that tapers from the toe or small end 1 to the heel or large end 2. The taper is such that the slot is of greatest depth and also greatest width at the heel. The sides of the slot, 3 and 4, are curved in profile by the generation and are also curved longitudinally, side 3 being concave and side 4 convex.

During generation there is an instantaneous line of contact between the cutting surface, usually a conical surface, described by the side edges of the face mill cutter, and the tooth side 3 or 4. As generation of side 3 proceeds this line of contact, which extends more or less diagonally across the tooth surface, progresses through angle 5 from the bottom point 6 at the heel to top point 7 at the toe, or from point 7 to point 6, depending upon the direction of generation. Similarly, on side 4 the contact line progresses through angle 8 from top point 9 at the heel to bottom point 11 at the toe, or from point 11 to point 9.

As shown, terminal point 6 is intermediate of terminal points 9 and 11 of angle 8. Hence in a plunge infeed of the cutter that immediately precedes generation of one tooth side, a maximum or near maximum amount of stock removal is achieved by having such infeed occur in the phase of generation where the contact is near point 6. After such infeed, which produces a slot of the general shape shown in full lines in FIG. 1, side 3 is generated to point 7 by forward roll of the work and the cutter-carrying cradle of the machine. Then tooth side 4 is generated from point 11 to point 9 by the return roll. At or about point 9 the cutter is withdrawn from the now completed slot, the work is indexed for cutting of the next tooth slot and the forward generating roll is started, this bringing the cutter and work to the position for the plunge infeed near point 6. Because of the angular offset 12 of points 9 and 6, the indexing operation may take place while the forward roll proceeds through this angle 12, with the cutter withdrawn from the work. Thus the indexing does not extend the tooth cutting cycle time beyond the time required for generation of the sides 3 and 4.

Figure 3:
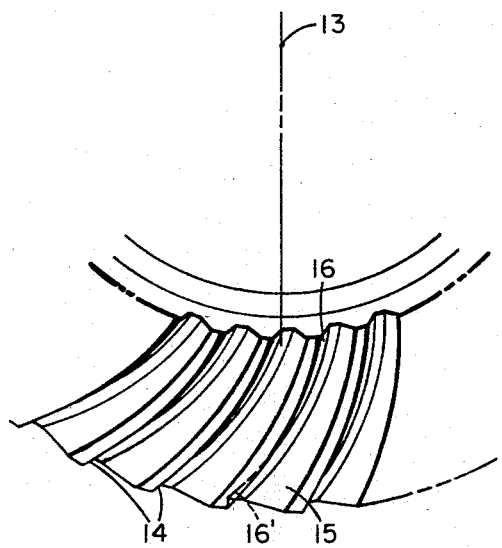
FIG. 3 is a fragmentary view of a gear capable of mating with the pinion, the view being in a plane perpendicular to the gear axis.

In the generation of pinions to mate with form cut gears, the cutter represents a tooth of a generating gear which is essentially like the pinion's mating gear. In conventional generators the cutter is carried by a rotary cradle whose axis represents the axis of such generating gear, and the plunge infeed is in the direction of this axis. FIG. 3 is a fragmentary view of a typical mate or generating gear, looking along its axis 13. The top lands 14 of the gear teeth lie on the face cone surface of the gear; the concave and convex tooth sides, 15 and 16, are either surfaces of revolution about the cutter axis, usually conical surfaces, or helicoidal surfaces whose helix axis is the cutter axis. As a result of their curvature, these tooth surfaces have a greater spiral angle at heel than at toe and even though the tooth side 16 is of positive pressure angle, the portion of it near the heel, designated 16′ lies directly beneath and is obscured by the adjacent portion of top land 14. Hence a pinion in contact with the gear, with its axis disposed in a vertical plane, and in the turning position wherein it would contact the tooth side portion 16′, could not be withdrawn from the gear, or returned to engagement with it, merely by motion in the direction of the gear axis. Similarly a cutter for the pinion, representing the gear tooth, could not be infed into the pinion or withdrawn in the corresponding phase of pinion generation, merely by motion along the axis 13, without mutilating the pinion.

Figure 4:
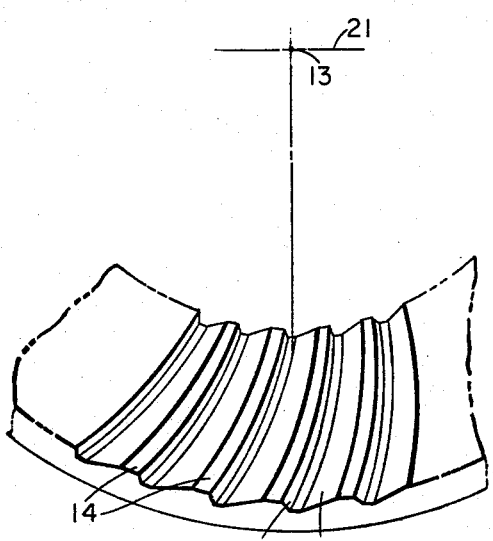
FIG. 4 is similar to FIG. 3, but with the gear tilted by 20°.

In FIG. 4 the same gear is shown with its axis tilted by 20° about a horizontal axis 21 disposed in the plane of the view. By this tilting, the tooth surfaces 15 and 16 may be seen in their entireties and a pinion in any turning position contacting these surfaces 15 and 16 could be withdrawn or returned by motion in a direction perpendicular to the plane of the view. The same is true of a cutter representing gear tooth surfaces 15 and 16. For this reason, to enable plunge infeed of the cutter when the generation is near point 6, FIG. 2, and withdrawal of the cutter when the generation is near point 9, the cradle axis 13 of the generating machine is inclined at an acute angle to the direction of cutter advance and withdrawal. It has been found that angle of 20° is satisfactory for most spiral bevel and hypoid pinions in present use.

Figure 5:
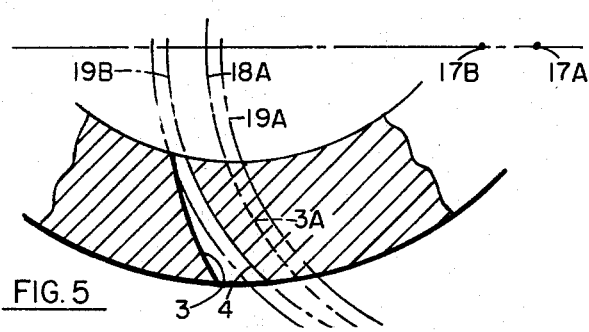
FIG. 5 is a fragmentary schematic sectional view of the pinion developed into its pitch plane, showing its relation to the cutter in the cutting of a tapered tooth slot.

FIG. 5 illustrates in principle the way in which taper of the tooth slot may be produced by displacement of the work angularly about its axis in combination with displacement in a direction perpendicular to work axis and the generating gear axis. In this view the pitch surface of the pinion is shown in plane development in the generating plane. With the cutter axis 17 at 17A, the outside blade edges of the cutter or circle 18A cut the concave tooth side in position 3A. The inside blade edges of the cutter, on circle 19A, simultaneously take a preliminary cut on the opposite side of the slot. Before cutting the convex side 4 to its final shape the cutter and the pinion are relatively displaced by turning the pinion to rotate its concave tooth side from 3A to 3, and by simultaneously shifting the cutter axis horizontally (relative to the pinion) to position 17B. In this position the inside edges of the cutter, on circle 19B, cut the convex tooth side 4. As a result of this procedure the slot between sides 3 and 4 is tapered. In order to prevent cutting while the angular and linear displacements are taking place, the rolling generating motion is continued far enough to bring the cutter clear of the tooth slot. An alternative (which however is not included in the machine now to be described) is to withdraw the cutter clear of the work while the displacements are being made.

Figure 6:
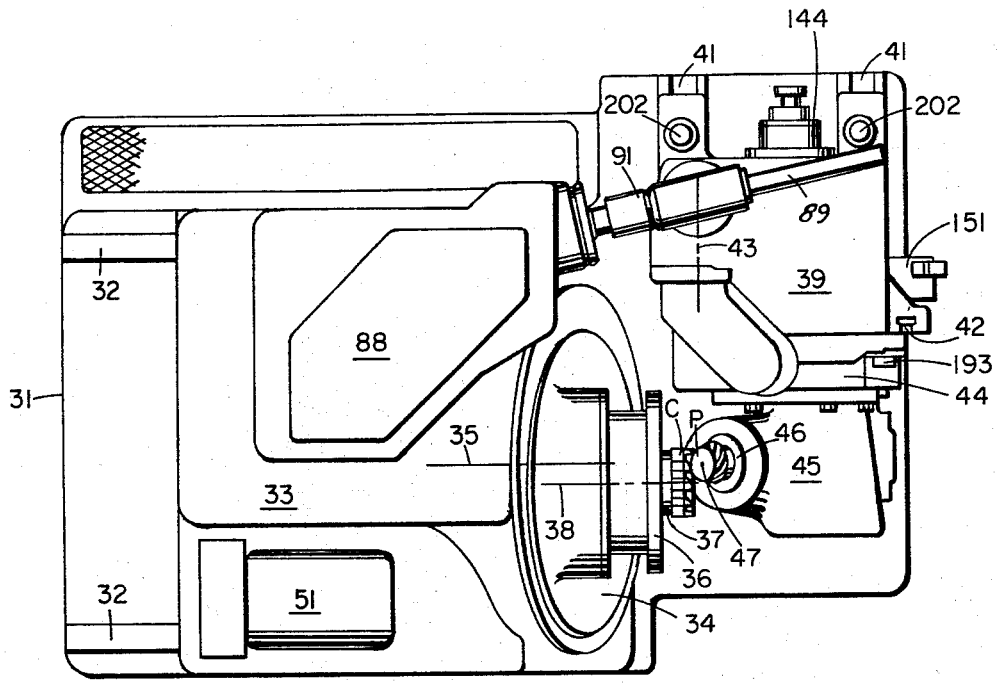
FIGS. 6 and 7 are respectively plan and side views of the machine.
Figure 7:
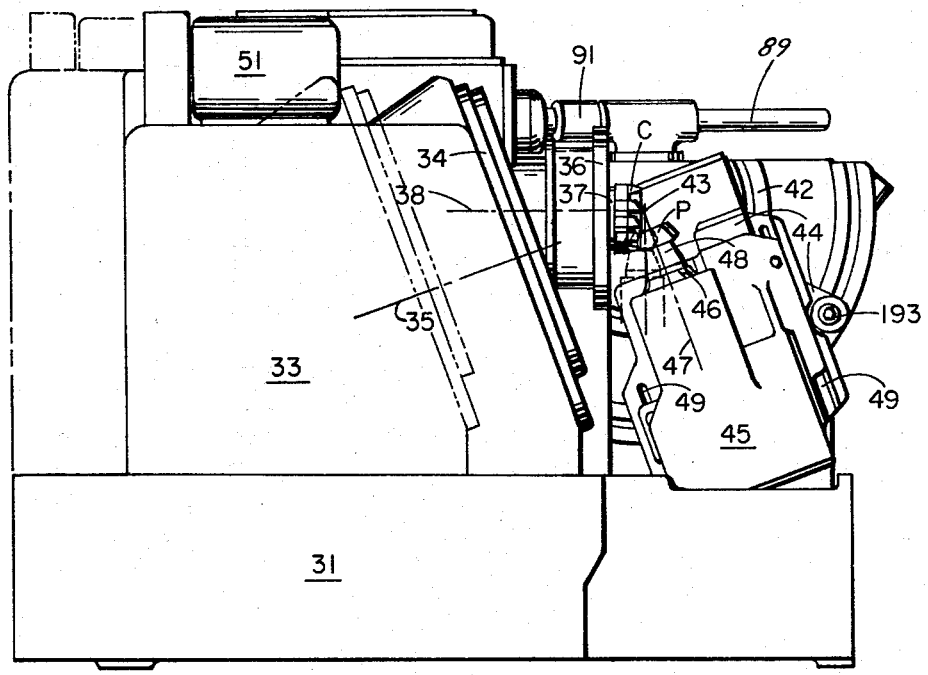

Referring now to FIGS. 6 and 7, the machine comprises a frame 31 provided with guides 32 supporting a slide 33, which constitutes the cradle housing of the machine, for rectilinear horizontal motion between a cutting position shown in full lines and a loading position shown in broken lines. A cradle 34 is rotatable in housing 33 about an axis 35 which is inclined at 20° to the horizontal and lies in a vertical plane parallel to guides 32. The cradle has adjustable thereon a cutter spindle carrier 36, journaling a spindle 37 on which a face mill cutter C is mounted. The adjustments of the carrier on the cradle enable the cutter to be set at various distances from cradle axis 35, and the cutter spindle axis 38 to be set at various inclinations to axis 35 and at various amounts of offset, from zero to the design maximum, to either side of axis 35. They also enable the cutter spindle to be adjusted along its axis 38 in carrier 36. The means by which these adjustments are made may be substantially as disclosed in Patent 2,792,764 to Carlsen et al.

A column 39 constituting a cross-slide is rectilinearly movable on horizontal guides 41 on the frame, in a direction perpendicular to cradle axis 35. Pivotally adjustable about circular guides 42 on the column, about a horizontal axis 43 perpendicular to axis 35, is a sector 44 which supports work head 45. The work head journals a work spindle 46 whose rotation axis 47 intersects axis 43 at right angles. The spindle carries a chuck 48 for the workpiece, in this case shank-type pinion P. Work head 45 is adjustable along guides 49 on sector 44, parallel to axis 47, to set the workpiece at the desired distance from axis 43.

The drive of the machine insofar as concerns its conventional functions will now be described. Referring to FIG. 8, the drive for the cutter C is from motor 51 through pulleys and belt 52, speed change gears 53, bevel gears 54, vertical shaft 55, and bevel gears 67 (or 56) and 57, horizontal shaft 58, and bevel gears 59 to shaft 61 on cradle axis 35, FIGS. 1 and 2. The foregoing portion of the drive is supported by cradle housing 33. The remainder of the drive to the cutter, all of which is within the cradle assembly, comprising cylindrical gears 62, bevel gears 63 and final reduction cylindrical gears 64, 65, the gear 65 being co-rotatable with spindle 37 and cutter C. The reversing rotations of the cradle and work spindle about their respective axes 35 and 47 are effected by a barrel cam 66 that is rotatable in the cradle housing 33 and is driven from shaft 55 through a cradle-housing-carried train comprising bevel gears 69, cycle speed change gears 71, 72, horizontal shaft 73, and worm 74 which drives worm wheel 75 that is co-rotatable with cam 66.

The generating train which drivingly connects the cradle with the work spindle comprises cradle-carried worm wheel 76, vertical worm 77, gears 78, 79, shaft 81, differential gear unit comprising side gears 82 and 83 and a planet gear 84, shaft 85 keyed to gear 83, ratio-of-roll change gears 86, and vertical shaft 87, all mounted in the cradle housing, with gears 86 accessibly disposed under cover 88, FIG. 6. A horizontal overhead shaft 89 in housing 91, FIGS. 6 and 7, is arranged to swivel about shaft 87 and about a vertical shaft 92 journaled in work column 39. Bevel gears 93 and 94 respectively keyed and slidably splined to shaft 89 mesh with gear 95 on shaft 87 and gear 96 on shaft 92. The latter is connected by bevel gears 97, shaft 98, angular bevel gears 99, shaft 101, bevel gears 102, telescoping shaft 103, bevel gears 104, and worm 105 to worm wheel 106 on work spindle axis 47. Shaft 98 is on horizontal axis 43 and shaft 103 is parallel to spindle axis 47. Shaft 101 and gears 102 are mounted in sector 44, while gears 104–106 are in workhead 45. Worm wheel 106 is secured to a sleeve 107 which is connected to work spindle 46 by an intermittent indexing mechanism (not shown) which may be in accordance with application Serial No. 444,268, filed by E. R. Beman on March 31, 1965. This mechanism is operated once per cycle of oscillation of the sleeve to effect an angular advance of the spindle 46 by one tooth pitch of the work gear relative to the sleeve.

The generating train is reversingly rotated by cam 66 through a cam follower 111 engaged in the continuous peripheral slot of the cam and carried by a slide 112 guided by the cradle housing 33 for vertical motion, i.e. motion parallel to the rotation axis of the cam. Slide 112 is a ball-nut through which screw 113 is threaded, the screw being journaled for rotation, and held against axial motion in the cradle housing. Angle-of-roll change gears 114 and gear 115 drivingly connect the screw to gear 79 of the generating train. As the cam 66 rotates unidirectionally the slide 112 is reciprocated to impart reversing rotation to screw 113 and, through the generating train, to the cradle 34 and to the work spindle 46.

For generating tapered tooth slots by the method of prior Patent No. 2,725,792, a cam 116, FIGS. 8 and 9, is connected to cam 66 for co-rotation therewith. Cam 116 acts through a follower roller 117, lever 118 and a rack 119, to reversingly rotate a pinion 120, and this rotation is added by differential 82, 83, 84 to the rotation imparted to shaft 81 by cam 66, so that the sum of the two cam-imparted motions is applied to shaft 85 and work spindle 46. Cam 116 is formed with a long rise followed by a short fall, the rise producing rotation of shaft 127 in the same direction throughout most of the forward and return rotations of shaft 81 effected by cam 66, and the fall being effective near the point of reversal of shaft 81 at a time after generation of the convex tooth side has ended and while no cutting is occurring. Since the added rotations produced by the two cams are therefore of the same sign during the generating roll in one direction, and of opposite sign during the return roll, the ratio-of-roll between the cradle and work spindle is greater in one direction of roll than in the other, producing taper of the tooth slots in the manner disclosed in the prior patent. In cases where this effect is not desired one of gears 128 may be removed and the carrier 132 secured against rotation.

In the present machine the lever 118 which carries roller 117 is fulcrumed on axis 121 to the cradle housing 33 and is pivoted by pin 122 to a hydraulic cylinder 123; and a piston 124 in the cylinder is integral with rack 119. A part 125 of the cradle housing supports a roller 126 which holds the rack in mesh with pinion 120 and also journals the adjacent part of shaft 127 on which the pinion is secured. The shaft is connected to the differential by ratio change gears 128, transmission gears 129, and gear 131 secured to the carrier 132 of differential planet gear 84, the carrier being rotatable on shaft 85. By exchange of gears 128 the ratio between the rotations imparted by cams 66 and 116 may be adjusted, to thereby change the taper of the tooth slots being cut.

The mechanism just described is also employed to introduce into the generating train the motion required for the angular set-over of the work P at the conclusion of the generating roll in each direction, which has previously been described with reference to FIG. 5. This set-over is effected by motion of piston 124 in cylinder 123, by hydraulic pressure applied through lines 133 and 134 by a reversing valve 135. The valve is connected to a suitable pressure source, not shown, by pressure line 136 and exhaust line 137. As shown in FIG. 8 the valve 135 is actuated by a cam 138 which rotates in 1:1 ratio with cam 66, being driven from shaft 73 by bevel gears 139 and worm and worm wheel 141. The cam 138 is in such phase relation to cam 66 as to reverse valve 135 concomitantly with each reversal of rotation of the cradle. The magnitude of the angular set-over of the work spindle is adjusted by means of a screw 142 which is threaded into cylinder 123 and determines the stroke of piston 124. After adjustment, the screw 142 is secured by means of a set screw 143.

Simultaneously with this angular set-over, the work spindle is set-over rectilinearly, also for the purpose described in connection with FIG. 5. This set-over is by a hydraulic cylinder and piston 144, 145, FIG. 9, arranged to shift the work column 39 along guides 41 on the frame 31, FIG. 6. The cylinder is secured to the column and the rod 146 of the piston is screw-threaded to the frame 31. The stroke of this set-over is set by adjustment of a tubular screw 147, after which the screw is locked by a set screw 148. The limit position of the column (cylinder 144) to the left in FIG. 9 is determined by the screw-adjustment of rod 146 in the frame, after which the rod is secured by set screw 149. The hydraulic lines 133, 134 extend to the opposite ends of the cylinder 144, so that the rectilinear and angular set-overs of the work relative to the cradle-carried cutter described with reference to FIG. 5 may be effected concomitantly. If desired these lines may be reversed to either or both of cylinders 123, 144. Also either or both of screws 142, 147 may be adjusted to prevent any stroke of the pistons in these cylinders. In this way the set-overs may be selectively employed, either with or without supplementation by motion derived from cam 116, to produce tooth surfaces 3, 4, FIG. 1 which conform closely to the exact shape desired.

Figure 10:
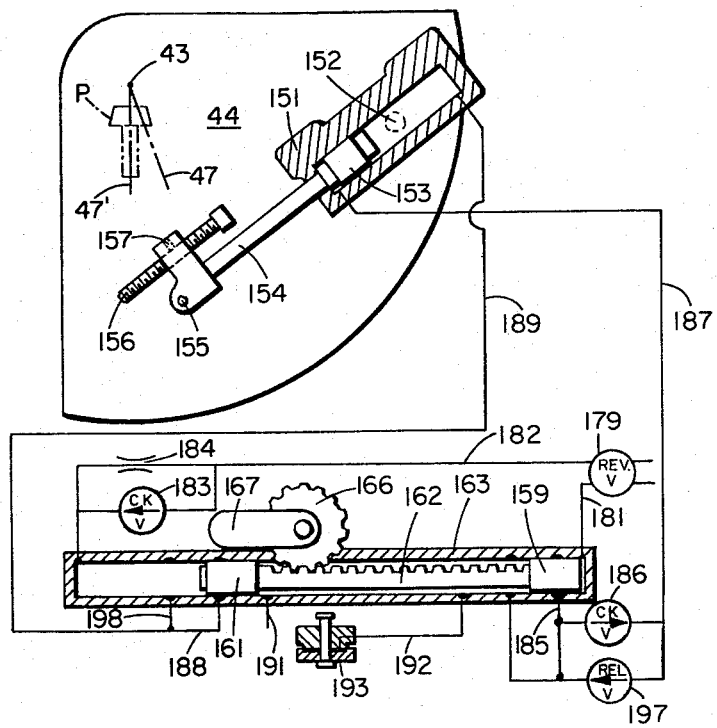

FIG. 10 illustrates schematically the device for moving the sector 44, and work head 45 mounted thereon, about horizontal axis 43 to carry workpiece P between a cutting position, wherein its axis 47 is inclined to the vertical, and a loading position in which its axis is vertical, as indicated at 47'. This device comprises hydraulic cylinder 151 pivoted on horizontal axis 152 to column 39 and piston 153 whose rod 154 is pivoted on horizontal axis 155 to the sector. The stroke of the piston, which determines the angle at which axis 47 is inclined to the vertical in cutting position, is determined by the abutment against the cylinder of screw 156 which is adjustably screw-threaded to a fitting on rod 154. After being adjusted in this fitting the screw is secured by a set screw 157.

Figure 11:
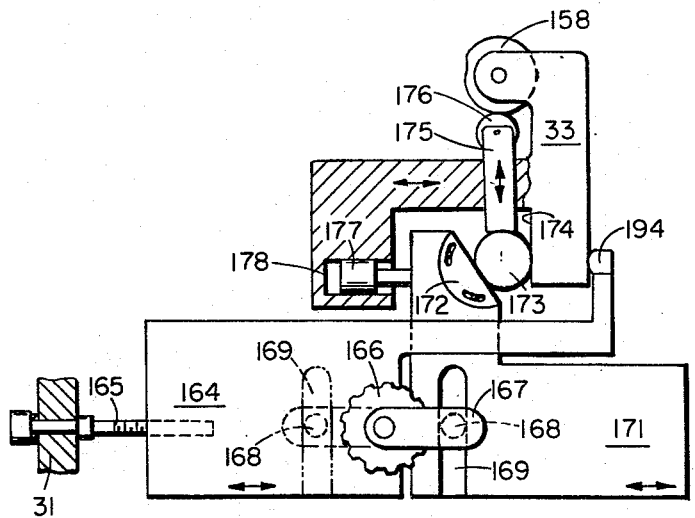

The motion of the cradle housing 33 along ways 32, FIGS. 6 and 7, is jointly by feed cam 158, FIGS. 8 and 11, and pistons 159 and 161, FIG. 10, which reciprocate rack 162 in cylinder 163. Cam 158 is journaled in the cradle housing 33 for co-rotation with cam 66 about a vertical axis. Cylinder 163 is secured to an adjustment bracket 164 which is adjustable horizontally on the machine frame 31, in the direction of cradle housing guides 32, by means of a screw 165. After such adjustment the bracket is secured to the frame by clamp screws, not shown. By this adjustment the cradle housing is set in the position required for the cutting of a gear of given design.

The rack 162 meshes with a pinion 166 that is secured to a crank 167 rotatably supported by bracket 164. The crank pin, 168, engages in a cross slot 169 in a slide 171 which is also guided for motion on the frame in a path parallel to that of cradle housing 33 and bracket 164. Slide 171 has angularly adjustable thereon, about a vertical axis, a shoe 172 which contacts a roller 173. This roller is confined between the shoe, a surface 174 of the cradle housing 33 and the end face of a rod 175. The latter is reciprocable in the cradle housing, transversely thereof, and supports follower roller 176 of cam 158. An hydraulic piston 177 in a cylinder 178 in the cradle housing 33, to which pressure is continuously applied, urges the housing to the left in FIG. 11 (and also in FIGS. 6 and 7) relative to slide 171, to maintain load on rollers 173 and 176. The angular position of shoe 172 may be adjusted to change the feed stroke of the cradle housing effected by cam 158.

Operation starts with the cradle housing 33 and sector 44 in work loading position, and with the machine drive, FIG. 8, stopped with feed cam 158 in the cradle housing-withdrawn position thereof and cam 66 in its position of completion of the generating roll from the small to the large end of a tooth slot (slightly beyond point 9, FIG. 2). After a workpiece has been loaded on spindle 46, a reversing valve 179, which is connected to suitable hydraulic pressure and return lines, is actuated to apply pressure to line 181 and place line 182 on exhaust. Because of a check valve 183 and restrictor 184 in line 182, pistons 159, 161, and rack 162 move to the left (in FIG. 10) relatively slowly. During the complete stroke the rack turns pinion 166 and crank 167 by 180°, from the broken line to the full line positions thereof in FIG. 11, moving the slide 171 to the right. The cradle housing moves as a unit with slide, from the loading position shown in broken lines in FIG. 7 to the cutting position shown in full lines.

At an early phase of this motion, piston 159 uncovers a port into line 185 leading through check valve 186 and line 187 to cylinder 151, applying pressure from line 181 to the lower side of piston 153. At the same time piston 161 uncovers a port leading through passages 188 and 189 to the upper end of cylinder 151, so that fluid may pass from the latter to an exhaust line 191. Hence piston 153 swings the sector 44 about axis 43 to bring the work axis to cutting position 47 during the initial portion of the relatively slow advance of the cradle housing 33 to cutting position. As piston 159 approaches its limit position to the left in FIG. 10 it uncovers a port opening into passage 192, causing pressure fluid from line 181 to actuate hydraulic clamps 193 which secure sector 44 to the column 39.

Then motor 51 is started and cam 158, acting through rollers 176 and 173, the latter reacting against shoe 172, feeds the cradle housing to the right, so that the cutter C cuts the tooth slot to full depth. During this infeed a dwell or near dwell of cams 66 and 116 is effective so that there is no rotation or only a little rotation of cradle and work. Depending upon the inclinations of the opposite side cutting edges of the cutter relative to the direction of infeed, a little rotation during the infeed is sometimes preferred, to equalize the chip load of these opposite edges, although the cutting action is essentially plunge milling. As the infeed ends, cam 158 acting through rollers 176 and 173 presses the cradle housing firmly against a stop 194 on bracket 164, thereby in effect clamping the housing to the machine frame. The infeed terminates with roller 176 on a dwell of cam 158 which becomes effective at the same time that the dwells of cams 66, 116, leave the follower rollers. The tooth slot shown in full lines in FIG. 1 now having been cut, the cams 66, 116, effect the forward and return generating rolls of the cradle and work spindle during which the tooth sides 3 and 4, FIGS. 1 and 2, are successively generated. At the conclusion of the return roll and while the succeeding forward roll begins, the fall of cam 158 allows piston 177 to withdraw the cradle housing. Indexing of the work spindle is now effected under the control of valve 195 actuated by a cam 196 co-rotatable with cam 138, FIG. 8.

The machine repeats the cutting and indexing cycle described in the preceding paragraph until all of the tooth slots around the work gear have been cut, whereupon the motor 51 is stopped. Valve 179 is reversed, applying pressure through line 182 and check valve 183 against piston 161. Line 181 is placed on exhaust so that the pistons 161, 159 are moved to the right, causing the crank 167 to withdraw the cradle housing. During this motion piston 159 passes by the port to line 192, releasing clamps 193, but check valve 186 and a pressure relief valve 197 prevent lowering of sector 44 until the cradle housing is almost fully withdrawn, at which time piston 161 opens a port 198 to apply pressure from line 182 to line 189. Pressure thus applied to the upper end of cylinder 151 swings the sector downwardly about axis 43 to bring the work spindle axis to its vertical loading position 47'.

Referring to FIG. 8, another cam, 199, co-rotatable with cams 138 and 196, controls a valve 201 for hydraulic clamps 202, FIG. 6, which secure the column 39 to the frame except at the moments of roll reversal effected by cams 66, 116. At these times the valve 201 releases these clamps to allow set-over of the column by pressure applied to cylinder 144, FIG. 9.

The machine described is paritcularly adapted for the preliminary generation of pinions which are subsequently to be finish cut. Such finish cutting may be carried out on the same machine, or on a similar machine modified in several respects. Since finish cutting is usually performed during only one generating roll of the machine, the return roll of the machine is idle, and indexing of the work spindle is effected during such return roll. This requires merely a modification of index cam 196 to eliminate the dwell for plunge infeed and a change in the phase relation of feed cam 66. Other modifications may include elimination of the differential 82-84, and of the mechanism including cam 116 and the other elements shown in FIG. 9 which serve to add motion to the generating train through the differential. The work column set-over cylinder 144 and the hydraulic clamps 202 and their control means 199, 201, may also be eliminated, since for finish cutting the column 39 remains secured to the frame throughout the entire operating cycle of the machine.

Having now described the preferred machine embodiments and methods of practicing our invention, what we claim is:

1. A gear generator comprising a frame, a work spindle rotatable in a work head on the frame, a cradle carrying a rotary cutting tool and rotatable in a cradle housing that is reciprocable on the frame to advance and withdraw the cradle relative to the work spindle, the direction of such reciprocation being in a plane parallel to both the work spindle and the cradle rotation axis, and the cradle rotation axis being inclined to said direction by an acute angle.

2. A gear generator according to claim 1 in which said acute angle is on the order of twenty degrees.

3. A gear generator according to claim 1 in which the work head is rotatable relative to the frame about an axis which is perpendicular to said plane and is in substantially intersecting relation to the cradle rotation axis when the cradle housing is in its advanced position, and means operable to (a) rotate the work head about said perpendicular axis to move the work spindle from a work-loading position perpendicular to the direction of cradle housing reciprocation and then advance the housing to cutting position, and (b) to withdraw the housing from cutting position and then rotate the work head to bring the work spindle to said work-loading position.

4. A gear generator according to claim 1 in which said direction is horizontal, said plane is vertical, and the cradle rotation axis inclines upwardly from the rear of the cradle to the front thereof on which the tool is mounted.

5. A gear generator according to claim 4 in which said work head is rotatable relative to the frame about a horizontal axis which is perpendicular to the cradle axis and in substantially intersecting relation thereto when the cradle housing is in its advanced position.

6. A gear generator according to claim 5 in which the work head is mounted for such rotation upon a slide which is adjustable on the frame in the direction of said horizontal axis.

7. A gear generator according to claim 6 in which the work head is mounted for such rotation upon the slide by means of a sector which is pivoted to the slide upon said horizontal axis, the work head being adjustable upon said sector in the direction of the axis of the work spindle.

8. A gear generator according to claim 5 having means operable to in sequence rotate the work head about said horizontal axis to move said work spindle from a vertical work-loading position to an inclined-from-vertical cutting position and then advance the cradle housing to cutting position, and to withdraw said housing from cutting position and then rotate the work head to bring the work spindle to said vertical work-loading position.

9. A gear generator comprising a frame, a work spindle rotatable in a work head on the frame, a cradle carrying a rotary cutting tool and rotatable in a cradle housing that is reciprocable horizontally on the frame to advance and withdraw the cradle relative to the work spindle, a slide movable horizontally on the frame perpendicularly to the direction of reciprocation of the cradle housing, and the work head being pivoted on said slide about an axis extending in the direction in which the slide is adjustable, said axis being perpendicular to the cradle rotation axis and in substantially intersecting relation thereto in the advanced position of the cradle housing.

10. A gear generator according to claim 9 having a drive train connecting the cradle and work spindle for rotation, means for reversingly rotating said drive train, means for effecting said movement of the slide horizontally on the frame in one direction concomitantly with reversal of drive train rotation in one sense and return movement of the slide concomitantly with reversal of said rotation in the opposite sense.

11. A gear generator according to claim 10 in which there is a means connected in said drive train for effecting back and forth rotations of the work spindle, without corresponding rotations of the cradle, coordinated with said movements of the slide.

12. A gear generator according to claim 11 in which said means for effecting relative rotations of the work spindle includes differential gearing in said drive train and through which forward and return rotations are imparted to the work spindle concomitantly with movements of said slide.

13. A gear generator comprising a cradle carrying a rotary cutter, a work spindle, means supporting the cradle and spindle for rotation about angularly related axes, a generating train connecting the cradle and spindle for rotation, means for effecting reversing operation of said train, said supporting means comprising a slide carrying the spindle for displacement in a path perpendicular to the cradle rotation axis, and means for effecting such displacement of the slide in one direction concomitantly with reversal of the train in one sense and return displacement concomitantly with reversal of the train in the opposite sense, so that the slide may be in one terminal position of displacement during gear generation in one direction and in another terminal position during gear generation in the opposite direction.

14. A gear generator according to claim 13 in which said path of the slide is perpendicular to a plane parallel to both the cradle axis and the work spindle.

15. A gear generator according to claim 14 having means for adjusting the terminal positions of the slide relative to said plane.

16. A gear generator according to claim 13 in which there is a means connected in said drive train for effecting forward and return rotary displacements of the work spindle, coordinated with said displacements of the slide, without corresponding rotations of the cradle.

17. A gear generator according to claim 16 in which said means for effecting forward and return rotary displacements of the work spindle include differential gearing in said drive train.

18. A gear generator according to claim 16 having means to effect relative advance and withdrawal of the cutter and work spindle, said means being so coordinated with the means for effecting said displacements that the work and cutter are in non-cutting relationship while the displacements occurs.

19. A gear generator according to claim 13 in which there is a means for varying the ratio of the rotations of the cradle and the spindle upon reversal of the generating train.

20. A gear generator according to claim 16 in which there is a means for varying the ratio of the rotations of the cradle and the spindle upon reversal of the generating train.

21. A gear generator according to claim 17 in which there is a means coordinated with operation of drive train for adding motion through said differential gearing to cause the work spindle to rotate at a different ratio to the cradle during rotation in one direction than during rotation in the opposite direction.

22. A gear generator comprising a cradle carrying a rotary cutter, a work spindle, a generating train which connects the cradle and spindle for rotation and which includes differential gearing, a unidirectionally rotating cam for reversingly driving said train, a second cam unidirectionally rotating in coordinated relation with the first cam for reversingly driving an element of said differential gearing to cause the work spindle to rotate at a different ratio to the cradle during rotation in one direction than during rotation in the opposite direction, means coordinated with reversal of the generating train and acting between said second cam and said element of the differential for effecting forward and return rotations of the spindle, without corresponding rotations of the cradle, respectively upon reversal of the drive by the first cam in one sense and upon reversal thereof in the opposite sense.

23. A gear generator according to claim 22 in which there is a means for moving said spindle back and forth in a path perpendicular to the cradle axis concomitantly with such reversal of drive by the first cam.

24. The method of generating gears with tapering tooth slots, with a rotary tool having opposite side cutting surfaces representing the opposite sides of a tooth of a generating gear which are coaxial surfaces of revolution, which comprises generating one side of the tooth slot of a work gear with one side cutting surface of the tool by rotation of the work gear about its axis and simultaneous rotation of the tool about the axis of the generating gear, then shifting the work gear in a direction perpendicular to the axis of the generating gear and rotating the work gear about its axis to position the opposite side cutting surface of the tool for contact with the opposite side of the tooth slot, and then generating said opposite side of the tooth slot by reverse rotation of the gear about its axis and simultaneous reverse rotation of the tool about the axis of the generating gear.

25. The method of claim 24 in which the work gear is rotated in a different velocity ratio to the rotation of the tool about the axis of the generating gear during the generation of one side of the slot than during the generation of the opposite side of the slot.

26. The method of cutting a generated spiral bevel or hypoid gear with a rotary tool whose opposite side cutting surfaces represent the opposite sides of a tooth of a generating gear, which opposite sides are coaxial surfaces of revolution, which comprises effecting (a) a relative plunge feed between the tool and work gear while their generating rotations respectively about the axes of the generating gear and the work gear are arrested in approximately the terminal position of generation of the concave side of the tooth slot at the outer end of the latter, (b) forward generating rotations of the tool and work gear to generate the concave side of the slot to the inner end thereof, (c) reverse generating rotations of the tool and work gear to generate the convex side of the slot from the inner to the outer ends thereof, (d) a relative withdrawal between the tool and work gear, (e) while said tool and work gear are relatively withdrawn, indexing the work gear for the cutting of a successive tooth slot, and also effecting forward generating rotations of the tool and work gear about said axes to approximately said terminal position of generation, and then (f) arresting said generating rotations for a repetition of the aforementioned step (a).

27. The method of claim 26 in which at the conclusion of the generation of the concave side of the slot the work gear is angularly displaced about its axis, and is also displaced relative to the generating gear in a direction perpendicular to the axis of the generating gear, to a position for generation of the convex side of the slot, and at the conclusion of the latter generation return displacements are effected.

28. The method of claim 26 in which the ratio of said generating rotations is different during forward rotation than during reverse rotation.

29. A spiral bevel or hypoid gear generator comprising a work spindle and a cradle carrying a rotary cutting tool, means supporting the spindle and cradle for rotation about their respective axes and for relative withdrawal and infeed motions in a path which is in a plane parallel to said axes and is inclined at an acute angle to the cradle axis, drive means for effecting reversing rotations of the cradle and work spindle for generating a tooth slot of a work gear on the spindle from heel to toe and return, said drive means providing an arrest of said rotations when said generation from heel to toe is adjacent the heel of the concave side of the slot, and feed means coordinated with said drive means for effecting the relative infeed while said rotations are arrested and for effecting withdrawal at the conclusion of the return generation from toe to heel.

30. A generator according to claim 29 in which said drive means includes means for indexing the work spindle during the forepart of the generation from heel to toe which precedes said infeed.

No references cited.

WILLIAM W. DYER, JR., *Primary Examiner.*